(12) United States Patent
Wiltzius et al.

(10) Patent No.: US 7,933,119 B2
(45) Date of Patent: Apr. 26, 2011

(54) HEAT TRANSFER SYSTEMS AND METHODS

(75) Inventors: Andrew L. Wiltzius, Fort Collins, CO (US); Robert Lee Crane, Fort Collins, CO (US); Jonathan Shea Robinson, Fort Collins, CO (US); River Yao, Guangdong (CN)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 12/533,567

(22) Filed: Jul. 31, 2009

(65) Prior Publication Data
US 2011/0026219 A1 Feb. 3, 2011

(51) Int. Cl.
*H05K 7/20* (2006.01)
(52) U.S. Cl. .............. 361/679.47; 361/679.51; 361/695; 361/697; 165/80.3; 165/104.33; 165/121; 165/122
(58) Field of Classification Search ............. 361/679.46, 361/679.47, 679.48, 679.5, 679.51, 679.54, 361/690–697, 702–712, 717–720, 722–724, 361/756, 775; 165/80.3, 121–126, 104.33, 165/104.34, 185; 454/184; 174/15.1, 16.1, 174/16.3, 252; 257/697, 706–727
See application file for complete search history.

(56) References Cited

U.S. PATENT DOCUMENTS

| | | | | |
|---|---|---|---|---|
| 3,592,260 A * | 7/1971 | Berger | ........................... | 165/121 |
| 4,790,374 A | 12/1988 | Jacoby | | |
| 6,023,413 A * | 2/2000 | Umezawa | ..................... | 361/697 |
| 6,088,226 A | 7/2000 | Rearick | | |
| 6,474,409 B1 | 11/2002 | Sterner | | |
| 6,657,121 B2 | 12/2003 | Garner | | |
| 6,661,661 B2 | 12/2003 | Gaynes et al. | | |
| 6,711,016 B2 * | 3/2004 | Chung et al. | .................. | 361/695 |
| 6,807,057 B2 * | 10/2004 | Rubenstein et al. | .......... | 361/697 |
| 6,813,149 B2 | 11/2004 | Faneuf et al. | | |
| 6,883,592 B2 | 4/2005 | Lee | | |
| 6,967,845 B2 | 11/2005 | Chiang | | |
| 6,981,542 B2 | 1/2006 | Lopatinsky et al. | | |
| 7,019,969 B2 | 3/2006 | Foster, Sr. et al. | | |
| 7,038,911 B2 * | 5/2006 | Foster et al. | .................. | 361/695 |
| 7,040,384 B2 * | 5/2006 | Shiang-Chich | ............... | 165/122 |
| 7,079,388 B2 | 7/2006 | Faneuf et al. | | |

(Continued)

FOREIGN PATENT DOCUMENTS

JP 2003/3133774 10/2001

(Continued)

OTHER PUBLICATIONS

Hisano, K, Thermoelectric Cooling of Computer Devices, Originally disclosed by IBM on Jul. 1, 1995 UTC TDB v 38 n7 Jul. 1995 p. 171-172.

(Continued)

*Primary Examiner* — Michael V Datskovskiy
(74) *Attorney, Agent, or Firm* — Michael S. Czarnecki

(57) ABSTRACT

A heat transfer system is provided. The system includes a heat sink disposed proximate a first circuit. An air mover is adapted to provide airflow, and at least a portion of the airflow can flow through the heat sink along a flow path having a path length. A first portion of the airflow flows along the entire path length through the heat sink. A remaining portion of the airflow exits the heat sink prior to flowing the entire path length.

17 Claims, 3 Drawing Sheets

U.S. PATENT DOCUMENTS

| | | | |
|---|---|---|---|
| 7,079,390 B2 * | 7/2006 | Barr et al. | 361/690 |
| 7,120,018 B2 * | 10/2006 | Shen et al. | 361/695 |
| 7,212,403 B2 | 5/2007 | Rockenfeller | |
| 7,215,548 B1 * | 5/2007 | Wu et al. | 361/703 |
| 7,256,997 B2 * | 8/2007 | Chen et al. | 361/697 |
| 7,304,845 B2 * | 12/2007 | Xia et al. | 361/697 |
| 7,349,212 B2 * | 3/2008 | Xia et al. | 361/697 |
| 7,363,963 B2 * | 4/2008 | Wang et al. | 165/80.3 |
| 7,394,654 B2 | 7/2008 | Zieman et al. | |
| 7,403,385 B2 | 7/2008 | Boone et al. | |
| 7,403,389 B2 * | 7/2008 | Yao et al. | 361/695 |
| 7,443,679 B2 * | 10/2008 | Li et al. | 361/704 |
| 7,495,912 B2 * | 2/2009 | Long et al. | 361/697 |
| 7,495,920 B2 * | 2/2009 | Chen et al. | 361/719 |
| 7,766,074 B2 * | 8/2010 | Lin et al. | 165/80.2 |
| 2002/0172008 A1 | 11/2002 | Michael | |
| 2006/0137861 A1 * | 6/2006 | Wang et al. | 165/104.33 |
| 2007/0145572 A1 * | 6/2007 | Chen et al. | 257/718 |
| 2007/0188995 A1 | 8/2007 | Franz | |
| 2008/0068796 A1 | 3/2008 | Pav | |
| 2008/0151498 A1 * | 6/2008 | Zhang | 361/697 |
| 2009/0040718 A1 | 2/2009 | Liu | |
| 2009/0316358 A1 * | 12/2009 | Zheng et al. | 361/697 |

FOREIGN PATENT DOCUMENTS

| | | |
|---|---|---|
| JP | 2003/152153 | 11/2001 |

OTHER PUBLICATIONS

Mansuria, MS Musa, RD, Processor Option Cooling Kit for Personal Computers, Originally disclosed by IBM on Nov. 1, 1992 UTC TDB n6 Nov. 1992 p. 154-155.

Processor Heatink with Slotted Fins, Originally disclosed by IBM on Oct. 11, 2002 UTC.

* cited by examiner

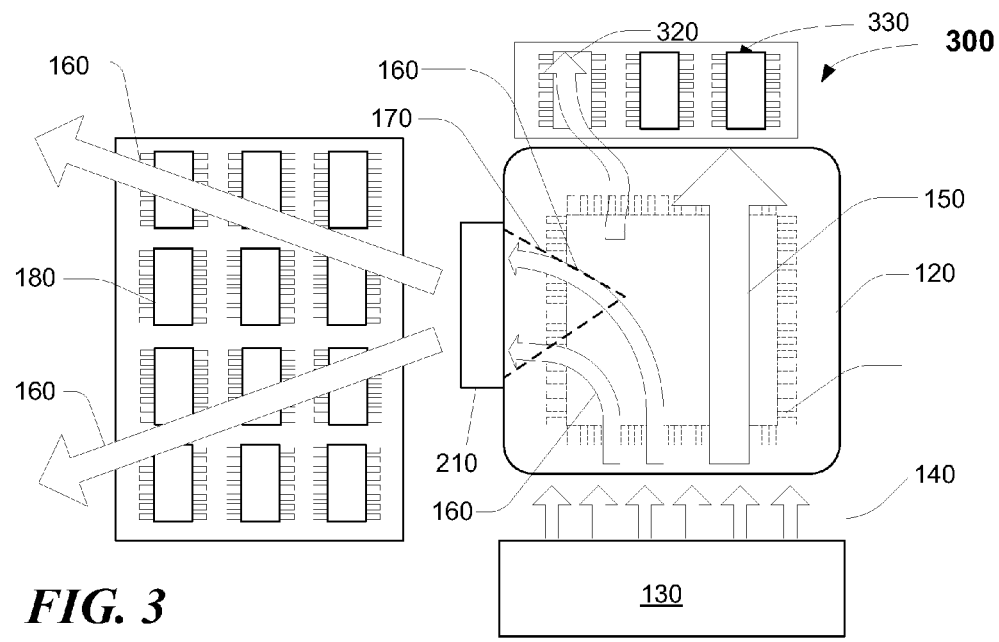

HEAT TRANSFER SYSTEMS AND METHODS

BACKGROUND OF THE INVENTION

Description of the Related Art

This section is intended to introduce the reader to various aspects of art which may be related to one or more embodiments discussed herein. This discussion is believed helpful in providing the reader with a general background in the art, and accordingly understood that the provided information should be read in this light and not as an admission of any prior art.

In 1979, the original Intel 16-bit 8086 processor used in the IBM Personal Computer had 29,000 gates (transistors) spaced at 3 µm and operating at a maximum clock speed of 10 megahertz ("MHz"). The latest Intel 64-bit processors often contain in excess of 500 million transistors spaced at 45 nm and operating at clock speeds in excess of 3 gigahertz ("GHz"). Yet the package dimensions between the 8086 and the latest 64-bit processors have not appreciably changed, as both require reasonably comparable board areas. With a 98% reduction in gate spacing and a 1.7 million percent increase in the number of gates, one can readily appreciate the artistry and degree of miniaturization required to accomplish such gate density.

However, with the stunning increase in density comes a comparable increase in heat generation. Quite simply, operating more gates at a higher clock speed demands increased current flow. The increased current flow corresponds to an increase in heating as the processor is in operation. Similar increases in miniaturization have been made in the area of memory, graphics processors, and the myriad of other dedicated controllers used in modern computing devices. Due to the ever decreasing chassis size of electronic devices, designers are often left trying to efficiently transfer heat away from these heat generating components with the minimum number of cooling devices.

SUMMARY OF THE INVENTION

A heat transfer system is provided. The system includes a heat sink disposed proximate a first circuit. An air mover is adapted to provide an airflow, and at least a portion of the airflow can flow through the heat sink along a flow path having a path length. A first portion of the airflow flows along the entire path length through the heat sink. A remaining portion of the airflow exits the heat sink prior to flowing the entire path length.

A heat transfer method is also provided. The method includes disposing a heat sink proximate a first circuit. The method further includes flowing air through the heat sink, the air flow provided using an air mover. The flow path through the heat sink can define a path length. The method includes passing a first portion of the flowing air along the entire path length, and exiting a remaining portion of the flowing air prior to flowing the entire path length. The method includes passing at least a portion of the flowing air across a second circuit.

A heat transfer apparatus is also provided. The apparatus can include a heat sink having a plurality of passages disposed therethrough. Each of the passages can define a flow path having a path length. A diverter feature can be adapted to apportion an airflow through the heat sink into a first portion and a remaining portion. The first portion can flow along the entire path length through the heat sink. The remaining portion can exit the heat sink prior to flowing the entire path length through the heat sink.

BRIEF DESCRIPTION OF THE DRAWINGS

So that the manner in which the above recited features can be understood in detail, a more particular description may be had by reference to one or more embodiments, some of which are illustrated in the appended drawings. It is to be noted, however, that the appended drawings illustrate only typical or exemplary embodiments and are therefore not to be considered limiting of its scope, for other, equally effective, embodiments may exist.

Advantages of one or more disclosed embodiments may become apparent upon reading the following detailed description and upon reference to the drawings in which:

FIG. 3 is a plan view depicting another illustrative heat transfer system, according to one or more embodiments described herein; and FIG. 3A is a perspective view of the illustrative heat transfer system depicted in FIG. 3, according to one or more embodiments described herein.

DETAILED DESCRIPTION

Figure 1:
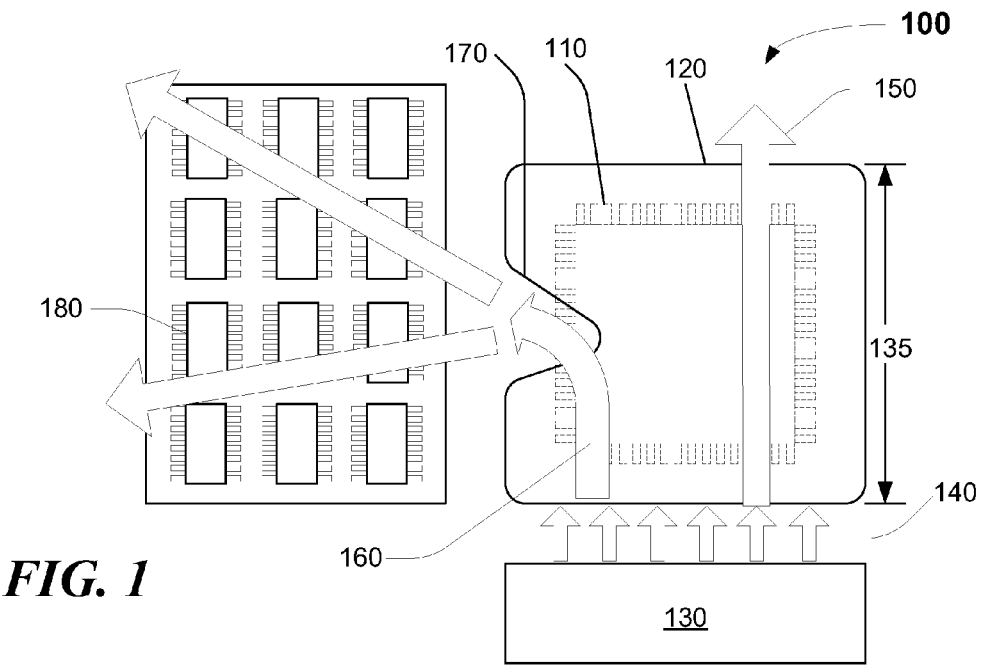
FIG. 1 is a plan view depicting an illustrative heat transfer system, according to one or more embodiments described herein.
Figure 1A:
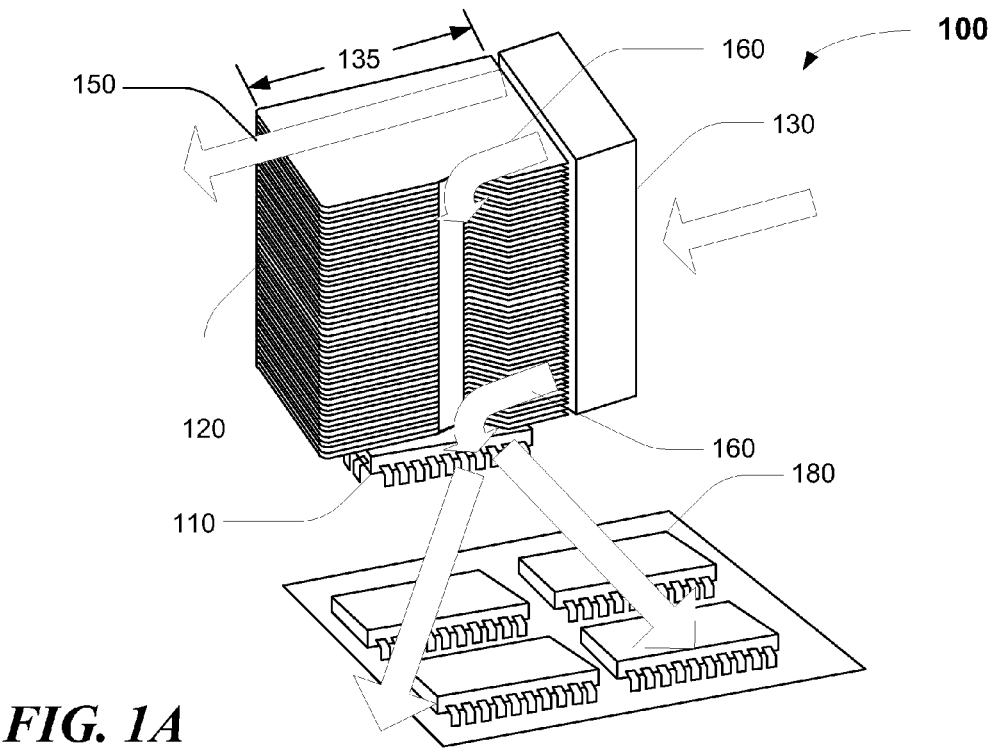
FIG. 1A is a perspective view of the illustrative heat transfer system depicted in FIG. 1, according to one or more embodiments described herein.

FIG. 1 is a plan view depicting an illustrative heat transfer system 100, according to one or more embodiments. FIG. 1A is a perspective view of the illustrative heat transfer system 100 depicted in FIG. 1, according to one or more embodiments. The heat transfer system 100 can include one or more first circuits 110 having one or more heat sinks 120 disposed proximate thereto, one or more air movers 130, and one or more second circuits 180. In one or more embodiments, the one or more air movers 130 can provide an airflow 140, at least a portion of which can flow around, about, or through the heat sink 120. A diverter feature 170 can be disposed internally within, or external to, the heat sink 120. The airflow 140 entering the heat sink 120 can be apportioned at least into a first portion 150 and a remaining portion 160 by the diverter feature 170. The first portion 150 of the airflow can flow along a path length 135 defined as a path traversing the entire heat sink 120. The remaining portion 160 of the airflow can exit the heat sink 120 prior to flowing along the entire path length 135.

In one or more embodiments, the first circuit 110 can include any device, system, circuit, or any combination of circuits, systems and/or devices suitable for the processing and/or storage of data, and capable of producing heat as a byproduct of the instant processing or storage of the data. In one or more specific embodiments, the first circuit 110 can include one or more board or socket mounted integrated circuits ("ICs"). Typical example of ICs suitable for providing the first circuit 110 can include, but are not limited to: one or more central processing units (CPUs); one or more graphical processing units (GPUs); one or more data storage units; and one or more controllers, for example the Northbridge or Southbridge controllers found in some personal computers.

In one or more embodiments, one or more heat sinks 120 can be disposed proximate the first circuit 110. In one or more embodiments, the one or more heat sinks 120 can be thermally bonded to all or a portion of the first circuit 110 using a heat transfer mastic or the like. The one or more heat sinks 120 can include any device, system, or any combination of systems and/or devices suitable for transferring, transporting, or otherwise conveying at least a portion of the heat generated by the first circuit 110 away from the first circuit 110 for dissipation or dispersal to the ambient environment surrounding the heat sink 120, for example to the air or other fluid medium surrounding the heat sink 120.

The heat sink 120 can incorporate one or more heat sink designs, including, but not limited to, one or more extruded fins, one or more prongs, and the like. In one or more specific embodiments, the one or more heat sinks can incorporate a plurality parallel plates having an interstitial space between adjacent plates, such as those depicted in FIGS. 1 and 1A. The individual plates forming the plurality of stacked plates in the heat sink 120 can have similar or dissimilar size and shape, for example, one or more plates can be bent, curved, or otherwise formed to enhance airflow through the heat sink 120. The heat sink 120 can be formed from any material having a high thermal conductivity, for example copper, copper alloys, aluminum and aluminum alloys. In one or more embodiments, one or more heat pipes can be disposed in, on, or about the heat sink 120 to enhance the overall heat transfer characteristics of the heat sink 120.

In one or more embodiments, a plurality of flow paths can exist for the passage of air or other coolant fluids around, about, or through the heat sink 120. In one or more specific embodiments, a path length 135 can be defined as the shortest distance that the first portion 150 of the airflow 140 can from the point of entry into the heat sink to the point of exit from the heat sink 120. In one or more embodiments, the path length 135 can permit the first portion 150 of the airflow 140 to contact the entire length of the heat sink 120.

The one or more air movers 130 can include any device, system, or combinations of systems and/or devices suitable for providing airflow 140. In one or more embodiments, the one or more air movers 130 can include, but are not limited to, one or more CPU fans, one or more GPU fans, one or more chipset fans, one or more power supply unit ("PSU") fans, one or more hard disk drive ("HDD") fans, or one or more personal computer interface ("PCI") slot fans. The one or more air movers 130 can include any number or frequency of axial flow or radial flow air movers. In one or more embodiments, the one or more air movers 130 can have a width and height of about 60 mm or larger; 80 mm or larger; 92 mm or larger; or 120 mm or larger.

At least a portion of the airflow 140 generated by the air mover 130 can be introduced to the heat sink 120. In one or more embodiments, within the heat sink 120, one or more diverter features 170 can be used to equally or unequally apportion the air flow 140 into a first portion 150 and a remaining portion 160. In one or more embodiments, the first portion 150 of the airflow can pass through the entire heat sink 120 by traveling the full or entire distance of the path length 135. In one or more embodiments, the remaining portion 160 of the airflow can exit, depart, or otherwise be evacuated from the heat sink 120 prior to traveling the entire distance of the path length 135. In one or more embodiments, the first portion 150 can include 10% or more; 25% or more; 50% or more; 75% or more; or 90% or more of the total airflow 140 provided by the one or more air movers 130, with the balance of the airflow 140 forming the remaining portion 160. In one or more embodiments, the diverter feature 170 can apportion the airflow 140 into the first portion 150 and the remaining portion 160 after the airflow 140 travels about 10% or less of the path length 135; about 20% or less of the path length 135; about 40% or less of the path length 135; about 60% or less of the path length 135; about 80% or less of the path length 135; or about 95% or less of the path length 135.

The diverter feature 170 can include any device, system, or any combination of systems and/or devices suitable for equally or unequally apportioning the airflow 140 to provide the first portion 150 and the remaining portion 160. In one or more embodiments, the diverter feature 170 can include one or more features disposed at least partially within the heat sink 120, for example one or more notches, voids, surface features, baffles, curved fins, bent fins, or combinations thereof. In one or more embodiments, the diverter feature 170 can include one or more features disposed at least partially external to the heat sink 120, for example one or more pipes, vents, chimneys, diverter plates, baffles, or combinations thereof. In one or more embodiments, the diverter feature 170 can include one or more features disposed at least partially within the heat sink 120 and one or more features disposed at least partially external to the heat sink 120, for example one or more internal baffles that apportion the airflow 140 into the first portion 150 and the remaining portion 160, where the remaining portion 160 is at least partially collected within a vertical conduit disposed external to the heat sink 120. In one or more embodiments, the diverter feature 170 can include an external feature formed using all or a portion of the fins forming the heat sink 120. In one or more embodiments, the diverter feature 170 can be a composite structure containing two or more discrete features, for example a notch or void disposed in all or a portion of the plates forming a heat sink, combined with one or more baffles that direct all or a portion of the remaining portion 160 from the heat sink 120, as depicted in FIGS. 1 and 1A.

All or a portion of the remaining portion 160 of the airflow 140 can be passed, on, around, about, across, or through all or a portion of at least one second circuit 180 after exiting the heat sink 120. The second circuit 180 can include any circuitry capable of generating heat. In one or more specific embodiments, the second circuit 180 can include, but is not limited to, one or more board-mounted or socket-mounted ICs. Typical example of ICs suitable for providing the second circuit 180 can include, but are not limited to, one or more central processing units (CPUs); one or more graphical processing units (GPUs); one or more data storage units; and one or more controllers, for example the Northbridge or Southbridge controllers found in some personal computers.

Figure 2:
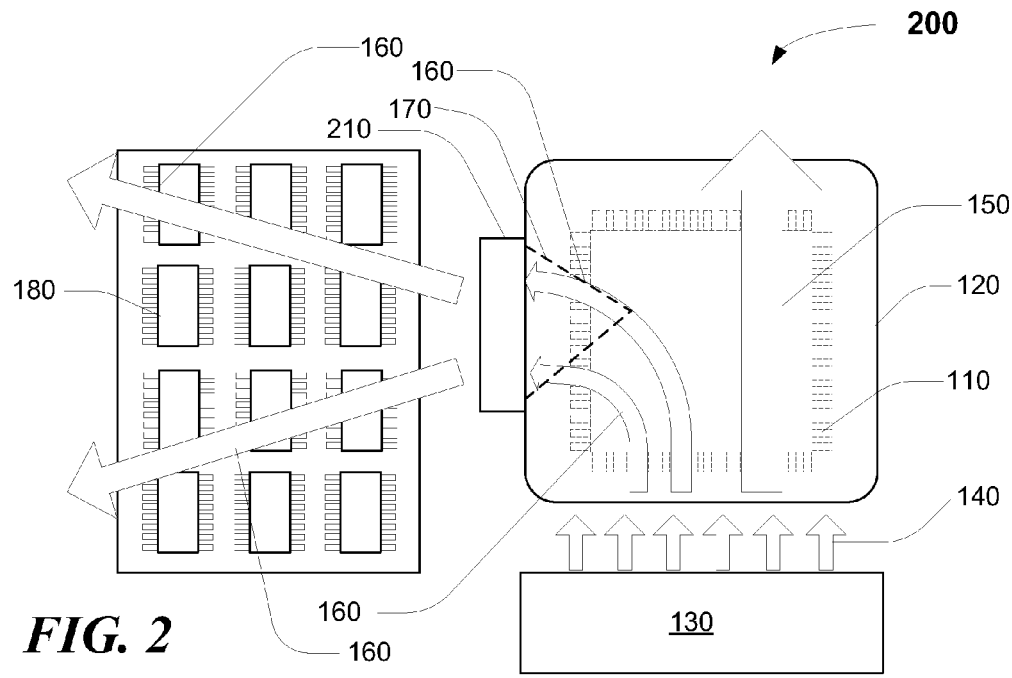
FIG. 2 is a plan view depicting another illustrative heat transfer system, according to one or more embodiments described herein.
Figure 2A:
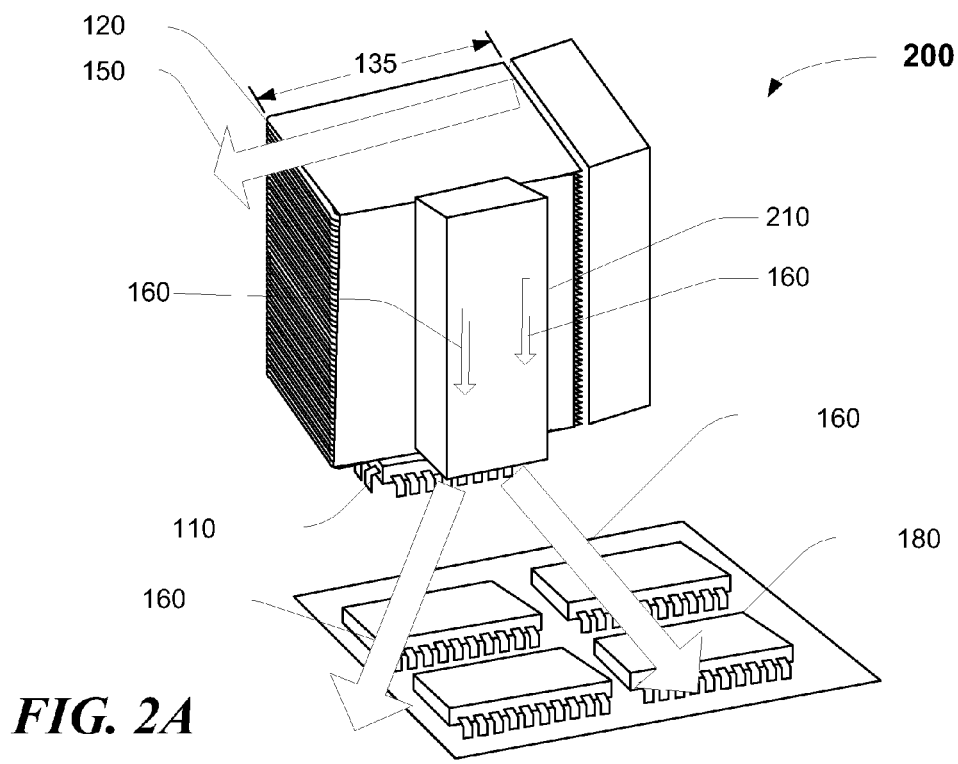
FIG. 2A is a perspective view of the illustrative heat transfer system depicted in FIG. 2, according to one or more embodiments described herein.

FIG. 2 is a plan view depicting another illustrative heat transfer system 200, according to one or more embodiments. FIG. 2A is a perspective view of the illustrative heat transfer system 200 depicted in FIG. 2, according to one or more embodiments. In one or more embodiments, the heat transfer system 200 can include one or more diverter features disposed external to the heat sink 120. In one or more specific embodiments, the one or more external diverter features can include one or more conduits 210. In one or more embodiments, all or a portion of the remaining portion 160 of the airflow created by the diverter feature 170 can be directed into one or more conduits 210 disposed external to the heat sink 120.

The one or more conduits 210 be partially or completely enclosed, for example the one or more conduits 210 can be open where the conduit is proximate the heat sink 120, and closed on all or a portion of all other external surfaces. The one or more conduits 210 can include one or more apertures or openings for exhausting all or a portion of the remaining portion 160 of the airflow 140 contained within the one or more conduits 210, for example the one or more conduits can have an open "end" or surface disposed proximate the second circuit 180 as depicted in FIGS. 2 and 2A. In one or more embodiments, although not depicted in FIG. 2 or 2A, one or more heat pipes can be partially or completely disposed within the one or more conduits 210.

In one or more embodiments, one or more diverters, diffusers, or baffles can be partially or completely disposed within the one or more conduits 210 to direct all or a portion of the remaining portion 160 of the airflow 140 exiting the one or more conduits 210 in one or more desired directions. In one or more embodiments, the one or more diverters, diffusers, or baffles can be partially or completely disposed within the one or more conduits 210, to direct the flow of the remaining portion 160 of the airflow 140 uniformly, radially outward from the one or more conduits 210 or to direct the flow of the remaining portion 160 linearly outward in one or more desired directions. In one or more specific embodiments, all or a portion of the remaining portion 160 can be directed from the one or more conduits 210 across, through, or about the second circuit 180 as depicted in FIGS. 2 and 2A.

The one or more conduits 210 can include any system, device, or any combination of systems and/or devices suitable for directing or conveying all or a portion of the remaining portion 160 of the airflow 140 from the heat sink 120. The one or more conduits 210 can have any size, shape, configuration, or geometry. For example, the one or more conduits 210 can have an oval, elliptical, square, rectangular, or any other profile. In one or more embodiments, the heat sink 120 can be a plurality of parallel stacked plates, and all or a portion of the one or more conduits 210 can be formed using at least a portion of the plurality of parallel stacked plates.

FIG. 3 is a plan view depicting another illustrative heat transfer system 300, according to one or more embodiments. FIG. 3A is a perspective view of the illustrative heat transfer system 300 depicted in FIG. 3, according to one or more embodiments. In one or more embodiments, two or more diverter features 170 can be partially or completely disposed internally within the heat sink 120, for example one or more notches and baffles (described in detail above with respect to FIGS. 1, 1A, 2, and 2A) can be combined with one or more angled baffles 310. In one or more embodiments, the one or more angled baffles 310 can provide airflow 320 in a preferred direction, for example downwards, such that the airflow 320 passes around, across, or through one or more circuits 330 disposed proximate the heat sink 120.

The one or more angled baffles 310 can have one or more bends, curves, surface features, or the like to preferentially cause all or a portion of the first portion 150 of the airflow 140 to flow in a desired direction, for example to cause a third portion 320 of the airflow 140 to flow across one or more third circuits 330. In one or more embodiments, the third portion 320 can include about 10% or more of the first portion 150 of the airflow 140; include about 20% or more of the first portion 150 of the airflow 140; include about 40% or more of the first portion 150 of the airflow 140; include about 60% or more of the first portion 150 of the airflow 140; include about 80% or more of the first portion 150 of the airflow 140; include about 90% or more of the first portion 150 of the airflow 140; include about 100% of the first portion 150 of the airflow 140.

The third circuit 330 can include any heat generating circuitry, including, but not limited to, one or more ICs. In one or more specific embodiments, the third circuit 330 can include, but is not limited to, one or more board-mounted or socket-mounted ICs. Typical example of ICs suitable for providing the third circuit 330 can include, but are not limited to, one or more central processing units (CPUs); one or more graphical processing units (GPUs); one or more data storage units; and one or more controllers, for example the Northbridge or Southbridge controllers found in some personal computers.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

While the foregoing is directed to one or more exemplary or illustrative embodiments, other and further embodiments may be devised without departing from the basic scope thereof, and the scope of all embodiments therefore should be determined by the claims that follow.

What is claimed is:

1. A heat transfer system, comprising:
 a first circuit having a heat sink disposed proximate thereto, the heat sink consisting of a plurality of horizontal, parallel, spaced plates, at least a portion of each of the plurality of plates removed to provide a void extending through the plurality of plates;
 an air mover to provide an airflow directed at least partially through the heat sink; and
 a diverter feature formed integrally with the heat sink and disposed on an exterior surface of the heat sink proximate the void, the diverter feature to apportion the airflow into at least a first portion and a second portion;
  wherein the first portion flows along the entire path length through the heat sink; and
  wherein the second portion exits the heat sink via the void prior to flowing the entire path length.

2. The system of claim 1, wherein the diverter feature comprises an identical displacement of an exterior edge of each of the plurality of parallel, spaced plates.

3. The system of claim 1, further comprising a second diverter feature disposed external to the heat sink.

4. The system of claim 3, wherein the second diverter feature comprises at least one at least partially closed conduit disposed proximate the heat sink.

5. The system of claim 3, wherein the second diverter feature comprises at least one angularly displaced surface extending from at least a portion of the plurality of parallel, spaced plates.

6. The system of claim 1, further comprising a second circuit disposed distal from the first integrated circuit; wherein the remaining portion of the airflow can flow at least partially about the second integrated circuit.

7. The system of claim 1, wherein the first circuit comprises at least one central processing unit ("CPU") integrated circuit.

8. The system of claim 6, wherein the second circuit is selected from the group of circuits consisting of: a graphics processing unit ("GPU") integrated circuit; random access memory ("RAM") integrated circuit; read-only memory ("ROM") integrated circuit; a controller integrated circuit; and a central processing unit ("CPU") integrated circuit.

9. A heat transfer method, comprising:
 removing a portion of each of a plurality of horizontal, parallel, spaced, plates forming a heat sink to provide a void extending through the heat sink;
 disposing the heat sink proximate a first circuit;
 flowing air about the heat sink;
 passing a first portion of the flowing air along an entire path length through the heat sink;

diverting the second portion of the flowing air from the void using a divider feature after flowing along a second path length less than the entire path length; and passing at least a portion of the remaining portion of flowing air across a second circuit.

10. The method of claim 9, wherein the diverter feature comprises an identical displacement of an exterior edge of each of the plurality of parallel, spaced plates.

11. The method of claim 9, further comprising:

passing at least a portion of the second portion of the airflow across a second diverter feature disposed externally proximate the plurality of parallel stacked plates.

12. The method of claim 11, wherein the second diverter feature comprises at least one at least partially closed conduit.

13. The method of claim 11, wherein the second diverter feature comprises at least one angularly displaced surface extending from at least a portion of the plurality of parallel, spaced plates.

14. A heat sink, comprising:

a plurality of horizontal, parallel, spaced, thermally conductive plates providing a first flowpath along a path length through the entire heat sink;

at least a portion of each of the plurality of plates removed to provide a void; and a diverter feature disposed proximate the void providing a second flowpath along a second path length shorter than the entire path length.

15. The heat sink of claim 14, wherein the diverter feature is integrally formed by each of the plurality of plates.

16. The heat sink of claim 14, further comprising a second diverter feature disposed external to the plurality of plates.

17. A computing device, comprising:

a first heat generating component;

a second heat generating component; and a heat sink disposed proximate the first heat generating component, the heat sink consisting of:

a plurality of horizontal, parallel, spaced, thermally conductive plates providing a first flowpath along a path length through the entire heat sink;

at least a portion of each of the plurality of plates removed to provide a void; and a diverter feature disposed proximate the void providing a second flowpath along a second path length shorter than the entire path length;

the second flowpath directed across at least a portion of the second heat generating component.

* * * * *

UNITED STATES PATENT AND TRADEMARK OFFICE
CERTIFICATE OF CORRECTION

| | | |
|---|---|---|
| PATENT NO. | : 7,933,119 B2 | Page 1 of 1 |
| APPLICATION NO. | : 12/533567 | |
| DATED | : April 26, 2011 | |
| INVENTOR(S) | : Andrew L. Wiltzius et al. | |

It is certified that error appears in the above-identified patent and that said Letters Patent is hereby corrected as shown below:

On the Title Pg, Item (74), Attorney, Agent, or Firm, line 1, delete "Czamecki" and insert -- Czarnecki --, therefor.

Signed and Sealed this
Eleventh Day of October, 2011

David J. Kappos
*Director of the United States Patent and Trademark Office*